June 15, 1954   J. S. DONALDSON   2,681,095
ANCHORING MEANS FOR WHEEL ANTISKID HARNESS
Filed Sept. 10, 1949   2 Sheets-Sheet 2

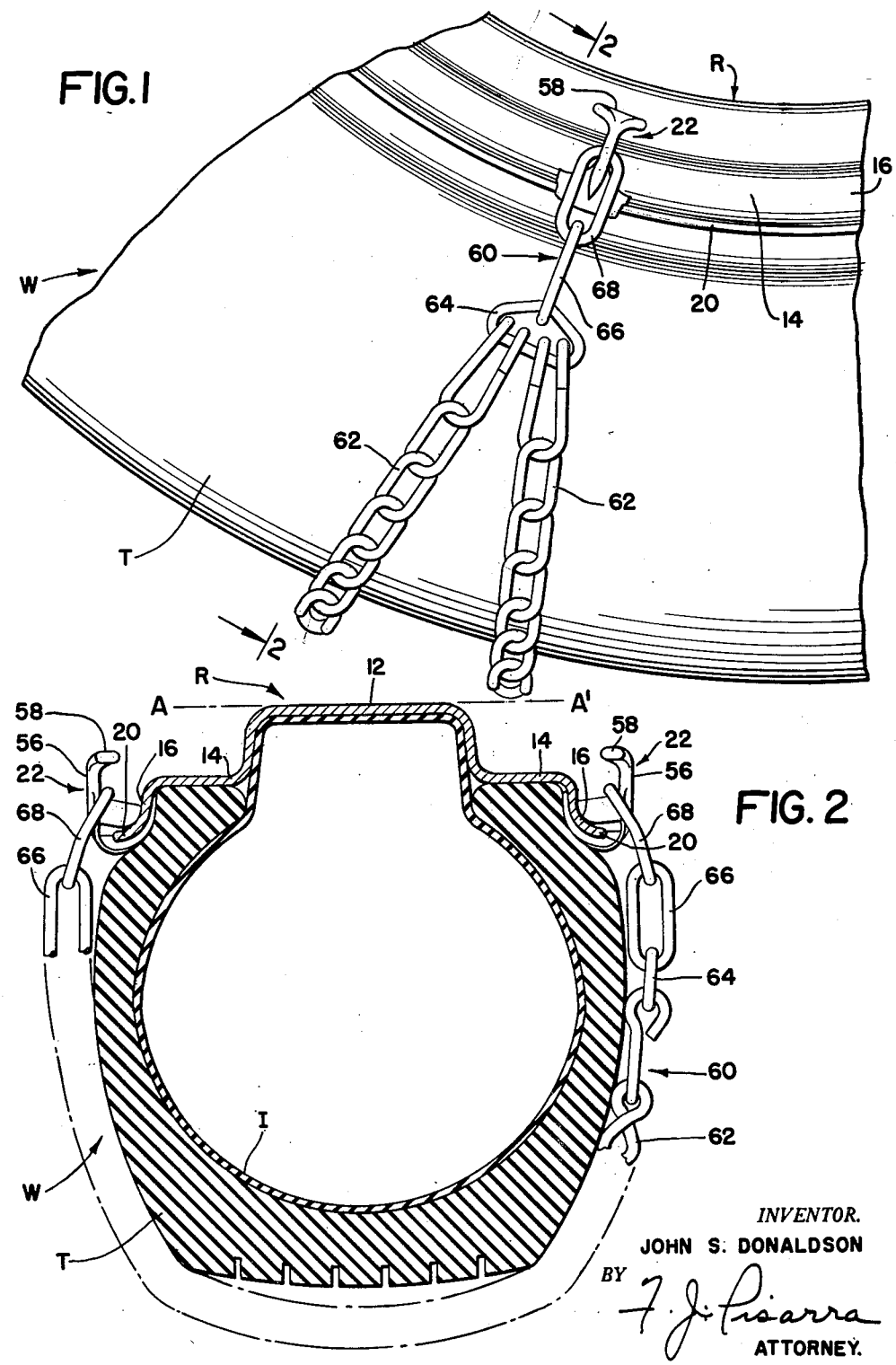

INVENTOR.
JOHN S. DONALDSON
BY
ATTORNEY.

Patented June 15, 1954

2,681,095

UNITED STATES PATENT OFFICE 2,681,095

ANCHORING MEANS FOR WHEEL ANTISKID HARNESS

John Shearman Donaldson, Chatham, N. J.

Application September 10, 1949, Serial No. 115,019

8 Claims. (Cl. 152—236)

This invention relates to anchoring means for anti-skid and traction harnesses for wheels, such as automobile wheels.

This application is a continuation-in-part of my abandoned application, Serial No. 738,637, filed April 1, 1947.

Conventional full tire chains for automobile wheels generally include a plurality of spaced cross or tread pieces that extend between two relatively long side pieces which form complete circles at the inner and outer sides of the tire when the chain is secured to a wheel. In applying such chains, it is necessary either to spread the chains out on the road and drive the vehicle wheel upon them, or to jack up the vehicle wheel to permit the chains being passed under the tire. Both procedures are time-consuming and laborious. Further, it is impossible to apply such chains to the wheels of a vehicle after the wheels have sunk into mud, sand, snow, or the like.

The present invention overcomes the foregoing difficulties in applying full tire chains to wheels, by permitting ready attachment of the chain elements to improved anchoring means or devices that are carried by the wheel rim, whether the wheel is resting on a hard-surfaced road or has become mired in mud, sand, snow, or the like.

The anchoring means of this invention is admirably suited to permit emergency anti-skid harnesses to be readily and rapidly attached to or removed from a wheel. My anchoring means is so constructed and arranged as to permit the ends of emergency harnesses to be quickly and easily secured to the wheel, thereby eliminating the need for straps and buckles that are essential parts of certain present-day emergency anti-skid harnesses. As will be apparent from the detailed description that follows, emergency anti-skid harnesses may be more readily attached to and removed from the anchoring means of this invention than has been heretofore possible with conventional emergency anti-skid harnesses.

It is a principal object of the invention to provide an improved means for anchoring anti-skid harnesses on a wheel. Such harnesses may be what are generally termed "full tire chains" or "emergency tire chains."

Another object of the invention is to provide anchoring means for an anti-skid harness for a rubber tired wheel, which anchoring means is unitary in construction and is adapted to frictionally engage and be maintained on the rim of the wheel independent of the tire.

Another object of the invention is to provide one-piece anti-skid harness anchoring devices adapted to be disposed on a wheel rim in a manner that the force exerted in the course of rotation of the wheel by a harness connected to the devices, tends to effect firmer engagement of the devices with the rim.

Another object of the invention is to provide anti-skid harness anchoring means adapted to be readily attached to or removed from the rim of a rubber tired wheel while the tire is mounted on the rim.

A further object of the invention is to provide improved anchoring means of the character indicated, so constructed and arranged with respect to the parts of a wheel as to facilitate attachment or removal of an anti-skid harness on or from a wheel, regardless of whether the wheel is on a firm surface or is mired.

A still further object of the invention is to provide apparatus of the character indicated that is simple and sturdy in construction, reasonable in manufacturing cost, and capable of performing its intended functions in an efficient and trouble-free manner.

With the above and other objects in view, the invention comprises the devices, combinations and arrangements of parts set forth in the following detailed description and illustrated in the annexed drawings of a preferred illustrative embodiment of the invention, from which the several features of the invention, together with the advantages obtainable thereby, will be readily understood by persons skilled in the art.

In the drawings:

Figure 1 is a view in side elevation of a portion of a typical automobile wheel illustrating a recommended form of anchoring means of the invention and an emergency tire chain operatively mounted on the wheel;

Figure 2 is a cross-sectional view taken along line 2—2 of Figure 1;

Figure 9:
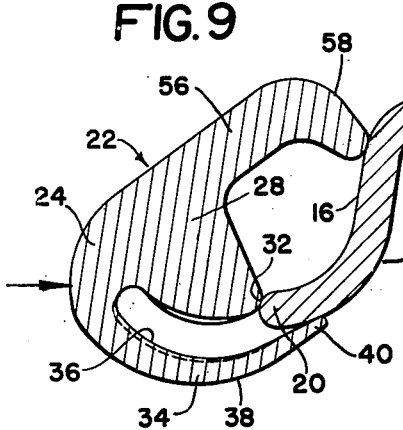
Figure 9 is a view of the anchoring device corresponding to Figure 7 and illustrates the initial relative position of parts of the device and the flange of a wheel rim in the course of effecting engagement of the device with the rim.

Referring now to the drawings wherein like reference characters denote corresponding parts throughout the several views, and more particularly to Figures 1 and 2, I have illustrated therein an outer portion of a wheel, such as an automobile wheel W, that includes a circular rim R, a tire casing T, and an inner tube I. Rim R is generally U-shaped in cross section, as best shown in Figure 2, and comprises a web 12 and a pair of spaced-apart side flanges 14 that extend outwardly of the web. The outer and inner surfaces of each flange 14 are denoted by numerals 16 and 18, respectively, while the free end of each flange is indicated at 20 (Figure 9).

A preferred and recommended form of one-piece anchoring means or device constructed in accordance with the invention and adapted to secure an anti-skid harness to wheel W is shown in detail in Figures 3–8, and is generally indicated by numeral 22. The anchoring device is preferably made of a suitable resilient metal, such as forged steel, and comprises a body member 24 having a front surface 26, an upper surface 28, and a rear surface 30. The juncture of upper surface 28 and rear surface 30 is indicated at 32 in Figures 4, 7 and 9. Integral with body 24 is an arcuate tongue 34 that has an inner surface 36 and an outer surface 38. The free end portion of the tongue is indicated at 40.

Rear surface 30 of the body and inner surface 36 of the tongue define an arcuate slot 42 that is adapted to receive a portion of rim flange 14. At least portions of the merging areas of body surface 30 between lines 44 and 46 and between lines 48 and 50 (Figure 5) are adapted to frictionally engage outer surface 16 of rim flange 14, while at least portions of the area of tongue inner surface 36 between lines 52 and 54 (Figure 8) are adapted to frictionally engage inner surface 18 of rim flange 14 when device 42 is mounted on the rim flange.

Figure 3:
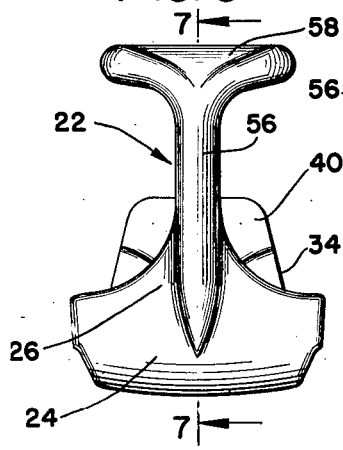
Figure 3 is a front elevational view in enlargement of the anchoring means or device shown in Figures 1 and 2.
Figure 4:
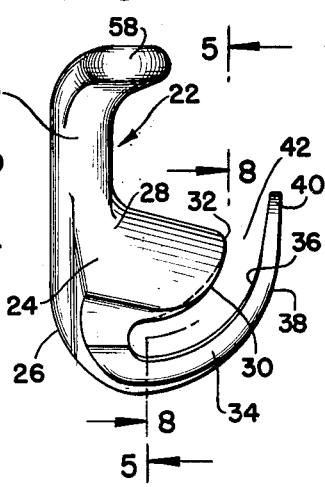
Figure 4 illustrates the anchoring means of Figure 3, as viewed from the right thereof.
Figure 5:
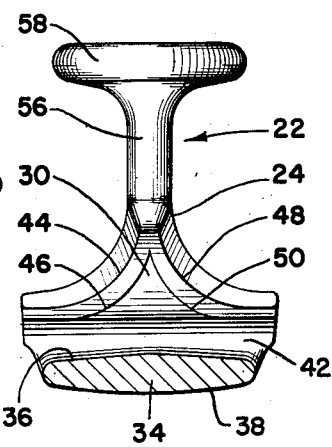
Figure 5 is a view taken along line 5—5 of Figure 4.
Figure 6:
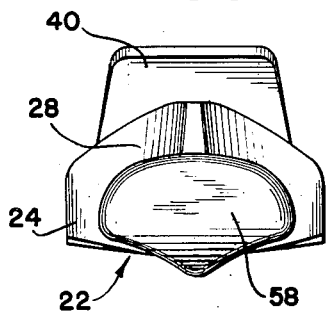
Figure 6 is a top plan view of Figure 3.
Figure 7:
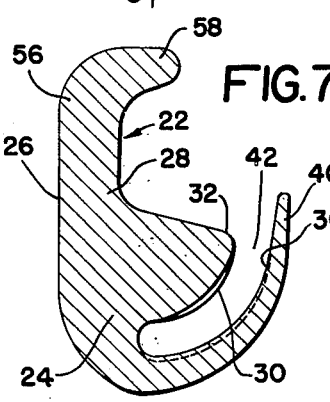
Figure 7 is a view taken along line 7—7 of Figure 3.
Figure 8:
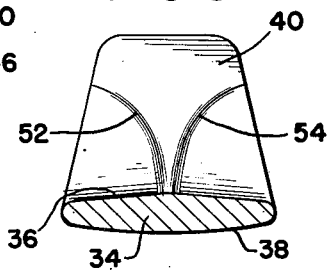
Figure 8 is a view taken along line 8—8 of Figure 4.

Also integral with body 24 is an upstanding arm 56 that is positioned wholly rearwardly of front surface 26 of the body. The free end of arm 56 is provided with an integral head 58 that is preferably generally normal to the axis of the arm and projects rearwardly and to each side of the arm, as best shown in Figures 3 and 4.

Figure 10:
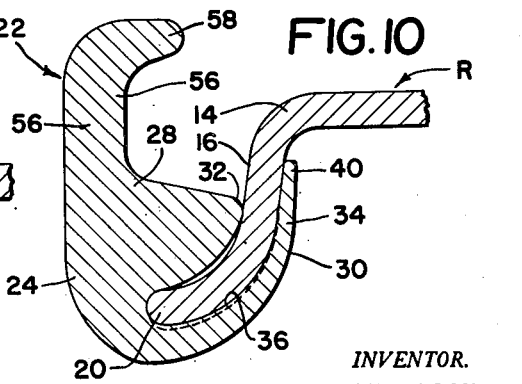
Figure 10 corresponds to Figure 9 and shows the parts in another relative position, namely, full engagement position.

To effect connection or engagement between anchoring device 22 and rim flange 14, the parts are first disposed in the relative position shown in Figure 9. With the parts so disposed, free end 20 of the flange projects into slot 42 and bears against body 24 at juncture 32, the inner end of head 58 bears against flange outer surface 16, and tongue end portion 40 bears against flange inner surface 18. Force is applied to the device by tapping the same with a hammer or other suitable tool generally along a line and in the region indicated by the arrow (Figure 9). Due to the resilience of the metal of the device, tongue 34 is fixedly downwardly and the device moves along a generally counter-clockwise arcuate path so that head 58 is swung upwardly out of engagement with the rim and flange end 20 enters further into slot 42. A few additional taps on the device will move the same into the relative position shown in Figure 10 with respect to the rim. The device is firmly gripped on the flange along at least portions of the areas defined between lines 44 and 46, between lines 48 and 50, and between lines 52 and 54, as will be apparent from an examination of the drawings.

The anchoring device of this invention is capable of being advantageously employed to effect ready and rapid attachment or removal of a full tire chain, such as the one disclosed in my said pending application, or of an emergency tire chain or harness 60, shown in Figures 1 and 2. Harness 60 comprises a pair of road-engaging chain members 62 that are connected at their ends by triangular coupler links 64, only one of which is shown. Secured to the illustrated coupler link 64 is a connector link 66 which is, in turn, connected to an end link 68. It will be noted that one such end link 68 is provided at each end of the emergency anti-skid harness. The harness may include an adjusting means (not shown) for taking up slack at the time that the harness is operatively connected to the wheel.

As shown in Figure 2, each of a pair of oppositely disposed anchoring devices 22 of the present invention is attached to a corresponding flange of rim R. With each anchoring device so mounted, it will be observed that its arm 56 is generally parallel to a radius of the rim. Further, each arm projects toward a plane, indicated by line A—A', that is tangent to rim web 12 and that is normal to the rim radius which is parallel to the corresponding arm. Each arm and its head 58 are positioned wholly rearwardly of the forward portion of front surface 26 of the body. The anchoring means illustrated and described prevents accidental disengagement of anti-skid harness 60 and does not present any obstruction which might strike against curbs or vehicle parts, such as tie rod or braking elements, during rotation of the wheel.

In assembling the apparatus, anchoring devices 22 are mounted on rim flanges 14, as earlier described herein. The devices may be mounted on the flanges after tire T has been placed on the rim. The tire does not serve to retain the anchoring devices on the rim since the anchoring devices are maintained on the rim solely by the friction developed between these elements. Anti-skid harness 60 is attached to the wheel by effecting engagement between links 68 and corresponding arms 56, as shown in Figures 1 and 2. The parts having been assembled as shown in Figures 1 and 2, the wheel may be rotated without loosening or causing disengagement of the anchoring devices from the rim. In fact, force exerted by the harness in the course of rotation of the wheel tends to move the devices with respect to the rim in a manner to effect firmer frictional holding engagement between the devices and the rim.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

1. In a device for anchoring anti-skid means to a wheel having a rim that includes an outwardly projecting flange, a body, a tongue integral with the body and having a substantial portion spaced from and defining an arcuate slot with the rear surface of the body, portions of the slot-defining surfaces of the body and the tongue being adapted to effect frictional holding engagement with corresponding surfaces of the flange, an arm integral with the body member and adapted to be disposed in a position generally parallel to a radius of the rim and project toward a plane tangent to the rim when the device is in aforesaid frictional engagement with the flange, and a head secured to the arm and projecting laterally of the side of the arm that faces the rim when the device is mounted on the rim.

2. In a device for anchoring anti-skid means to a wheel having a rim that includes an outwardly projecting flange, a body, a tongue integral with the body and having a substantial portion spaced from and defining an arcuate slot with the rear surface of the body, said tongue including a free end portion that extends above the rear surface of the body, portions of the slot-defining surfaces of the body and the tongue being adapted to effect frictional holding engagement with corresponding surfaces of the flange, an arm integral with the body member and adapted to be disposed in a position generally parallel to a radius of the rim and project toward a plane tangent to the rim when the device is in aforesaid frictional engagement with the flange, and a head secured to the arm and projecting laterally of the side of the arm that faces the rim when the device is mounted on the rim.

3. A one-piece device for anchoring an end of an anti-skid means to a wheel having a rim that includes an outwardly projecting curved flange, said device comprising a body, a resilient tongue having a substantial portion spaced from and defining an arcuate slot with the rear surface of the body, said slot having a configuration conforming substantially to that of a portion of the flange, portions of the surfaces of the device that define the slot being adapted to effect frictional holding engagement with corresponding surfaces of the flange, an arm projecting from the body toward the axis of the rim when the device is mounted on the flange, and an enlarged head at the free end of the arm for holding a link of an anti-skid means on the device.

4. A one-piece device for anchoring an end of an anti-skid means to a wheel having a rim that includes an outwardly projecting curved flange, said device comprising a body, a resilient tongue having a substantial portion spaced from and defining an arcuate slot with the rear surface of the body, said tongue including a free end portion that extends above the rear surface of the body, said slot having a configuration conforming substantially to that of a portion of the flange, portions of the surfaces of the device that define the slot being adapted to effect frictional holding engagement with corresponding surfaces of the flange, an arm projecting from the body toward the axis of the rim when the device is mounted on the flange, and an enlarged head at the free end of the arm for holding a link of an anti-skid means on the device.

5. A one-piece device for anchoring an end of an anti-skid means to a wheel having a rim that includes an outwardly curved flange, said device comprising a body, a resilient tongue having a substantial portion spaced from and defining an arcuate slot with the rear surface of the body, said slot having a configuration conforming substantially to that of a portion of corresponding surfaces of the rim flange, portions of the surfaces of the device that define the slot being adapted to effect frictional holding engagement with corresponding surfaces of the flange, an arm adapted to be disposed in a position generally parallel to a radius of the rim and project toward the axis of the rim when the device is mounted on the flange, and an enlarged head at the free end of the arm for retaining an element of an anti-skid means on the device, said device being so constructed and arranged when mounted on the flange and engaged by the anti-skid means that, upon rotation of the wheel, force exerted by the anti-skid means tends to effect firmer engagement of the device with the rim.

6. A one-piece device for anchoring an end of an anti-skid means to a wheel having a rim that includes an outwardly curved flange, said device comprising a body, a resilient tongue having a substantial portion spaced from and defining an arcuate slot with the rear surface of the body, said slot having a configuration conforming substantially to that of a portion of corresponding surfaces of the rim flange, said tongue including a free end portion that extends above the rear surface of the body, portions of the surfaces of the device that define the slot being adapted to effect frictional holding engagement with corresponding surfaces of the flange, an arm adapted to be disposed in a position generally parallel to a radius of the rim and project toward the axis of the rim when the device is mounted on the flange, and an enlarged head at the free end of the arm for retaining an element of an anti-skid means on the device, said device being so constructed and arranged when mounted on the flange and engaged by the anti-skid means that, upon rotation of the wheel, force exerted by the anti-skid means tends to effect firmer engagement of the device with the rim.

7. A one-piece device for anchoring an end of an anti-skid means to a wheel having a rim that includes an outwardly curved flange, said device comprising a body, a resilient tongue having a substantial portion spaced from and defining an arcuate slot with the rear surface of the body, said slot having a configuration conforming substantially to that of a portion of corresponding surfaces of the rim flange, portions of the surfaces of the device that define the slot being adapted to effect frictional holding engagement with corresponding surfaces of the flange, an arm adapted to be disposed in a position generally parallel to a radius of the rim and project toward the axis of the rim when the device is mounted on the flange, and a head at the free end of the arm and projecting laterally of the side of the arm that faces the rim when the device is mounted on the flange for retaining an element of an anti-skid means on the device, said arm and head being positioned substantially wholly rearwardly of the front of the body when the device is mounted on the rim, said device being so constructed and arranged when mounted on the flange and engaged by the anti-skid means that, upon rotation of the wheel, force exerted by the anti-skid means tends to effect firmer engagement of the device with the rim.

8. A one-piece device for anchoring an end of an anti-skid means to a wheel having a rim that includes an outwardly curved flange, said device comprising a body, a resilient tongue having a substantial portion spaced from and defining an arcuate slot with the rear surface of the body, said slot having a configuration conforming substantially to that of a portion of corresponding surfaces of the rim flange, said tongue including a free end portion that extends above the rear surface of the body, portions of the surfaces of the device that define the slot being adapted to effect frictional holding engagement with corresponding surfaces of the flange, an arm adapted to be disposed in a position generally parallel to a radius of the rim and project toward the axis of the rim when the device is mounted on the flange, and a head at the free end of the arm and projecting laterally of the side of the arm that faces the rim when the device is mounted on the flange for retaining an element of an anti-skid means on the device, said arm and head being positioned substantially wholly rearwardly of the front of the body when the device is mounted on the rim, said device being so constructed and arranged when mounted on the flange and engaged by the anti-skid means that, upon rotation of the wheel, force exerted by the anti-skid means tends to effect firmer engagement of the device with the rim.

References Cited in the file of this patent

UNITED STATES PATENTS

| Number | Name | Date |
| --- | --- | --- |
| 2,171,592 | Nagle | Sept. 5, 1939 |
| 2,202,129 | Turner | May 28, 1940 |
| 2,204,886 | Devlin | June 18, 1940 |
| 2,258,011 | Inman | Oct. 7, 1941 |
| 2,344,970 | Copp | Mar. 28, 1944 |
| 2,344,971 | Copp | Mar. 28, 1944 |